(12) United States Patent
Mate et al.

(10) Patent No.: US 11,825,170 B2
(45) Date of Patent: Nov. 21, 2023

(54) APPARATUS AND ASSOCIATED METHODS FOR PRESENTATION OF COMMENTS

(71) Applicant: Nokia Technologies Oy, Espoo (FI)

(72) Inventors: Sujeet Shyamsundar Mate, Tampere (FI); Arto Lehtiniemi, Lempäälä (FI); Antti Eronen, Tampere (FI); Jussi Leppänen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 129 days.

(21) Appl. No.: 17/281,302

(22) PCT Filed: Sep. 27, 2019

(86) PCT No.: PCT/EP2019/076206
§ 371 (c)(1),
(2) Date: Mar. 30, 2021

(87) PCT Pub. No.: WO2020/070003
PCT Pub. Date: Apr. 9, 2020

(65) Prior Publication Data
US 2022/0007078 A1    Jan. 6, 2022

(30) Foreign Application Priority Data
Oct. 4, 2018  (EP) .................................. 18198705

(51) Int. Cl.
*H04N 21/4788*  (2011.01)
*H04N 21/242*   (2011.01)
(Continued)

(52) U.S. Cl.
CPC ......... *H04N 21/4788* (2013.01); *G06Q 50/01* (2013.01); *H04N 21/242* (2013.01); *H04N 21/437* (2013.01); *H04N 21/4882* (2013.01)

(58) Field of Classification Search
CPC .............. H04N 21/242; H04N 21/437; H04N 21/4788; H04N 21/4882
See application file for complete search history.

(56) References Cited

U.S. PATENT DOCUMENTS 9,015,245 B1    4/2015  Lee et al.
9,396,502 B2    7/2016  Leibrock et al.
(Continued)

FOREIGN PATENT DOCUMENTS

CN    104869467 A    8/2015
EP    2706754 A2     3/2014
(Continued)

OTHER PUBLICATIONS

Office action received for corresponding Indian Patent Application No. 202147019332, dated Feb. 28, 2022, 6 pages.
(Continued)

*Primary Examiner* — Kyu Chae
(74) *Attorney, Agent, or Firm* — Harrington & Smith (57) ABSTRACT

An apparatus configured to: receive comment information from a first device associated with audio-visual content for presentation at a second device and a comment time indicative of a time during the audio-visual content; receive timing information from the second device indicative of a time during the audio-visual content that is currently being presented; determine a relevant-comment time; and wherein if the time during the audio-visual content that is currently being presented at the second device is greater than the relevant-comment time, display the comment with the audio-visual content presented at the second device at a delayed time comprising: a) a time during the audio-visual content at which there is a reoccurrence of a first event that occurred in the audio-visual content at the comment time; or
(Continued)

b) a time during the audio-visual content at which there is a second event, different to but similar to the first event.

20 Claims, 5 Drawing Sheets

(51) Int. Cl.
*H04N 21/437* (2011.01)
*H04N 21/488* (2011.01)
*G06Q 50/00* (2012.01)

(56) References Cited

U.S. PATENT DOCUMENTS

| | | |
|---|---|---|
| 2010/0251094 A1 | 9/2010 | Holm et al. |
| 2013/0173742 A1 | 7/2013 | Thomas et al. |
| 2013/0239146 A1 | 9/2013 | Cherry et al. |
| 2014/0140679 A1 | 5/2014 | Khader et al. |
| 2015/0110470 A1 | 4/2015 | Zhang et al. |
| 2016/0092053 A1 | 3/2016 | Loganathan et al. |
| 2016/0149967 A1 | 5/2016 | Lewis et al. |
| 2017/0093769 A1 | 3/2017 | Lind et al. |
| 2017/0199010 A1* | 7/2017 | Baker ............... G06T 7/246 |
| 2017/0229152 A1* | 8/2017 | Loganathan ....... G06F 16/735 |

FOREIGN PATENT DOCUMENTS

| | | |
|---|---|---|
| WO | 03/096175 A1 | 11/2003 |
| WO | 2006/011754 A1 | 2/2006 |

OTHER PUBLICATIONS

"Moderating Gaming Websites and Apps", WebPurify, Retrieved on Mar. 3, 2021, Webpage available at : https://www.webpurify.com/gaming/.

Extended European Search Report received for corresponding European Patent Application No. 18198705.8, dated Nov. 16, 2018, 10 pages.

International Search Report and Written Opinion received for corresponding Patent Cooperation Treaty Application No. PCT/EP2019/076206, dated Oct. 23, 2019, 13 pages.

Office action received for corresponding European Patent Application No. 18198705.8, dated Apr. 8, 2021, 5 pages.

Office action received for corresponding European Patent Application No. 18198705.8, dated Oct. 13, 2022, 6 pages.

* cited by examiner

APPARATUS AND ASSOCIATED METHODS FOR PRESENTATION OF COMMENTS

RELATED APPLICATION

This application claims priority to PCT Application No. PCT/EP20191076206, filed on Sep. 27, 2019, which claims priority to EP Application No. 18198705.8, filed on Oct. 4, 2018, each of which is incorporated herein by reference in its entirety.

TECHNICAL FIELD

The present disclosure relates to the field of presentation of audio-visual content with comments from different consumers of the same audio-visual content. In particular, it is related to the determination of whether a comment is relevant and when it should be presented, associated apparatus, methods and computer programs.

BACKGROUND

The provision of social interaction while consuming audio-visual content is becoming common. The audio-visual content experience, particularly if provided by virtual reality may be enhanced by communication of comments between users who may be experiencing the same audio-visual content. However, providing for an effective communication of one or more comment may be difficult.

The listing or discussion of a prior-published document or any background in this specification should not necessarily be taken as an acknowledgement that the document or background is part of the state of the art or is common general knowledge. One or more aspects/examples of the present disclosure may or may not address one or more of the background issues.

SUMMARY

In a first example aspect there is provided an apparatus comprising means configured to:
  receive comment information from a first device, the comment information associated with audio-visual content and comprises a comment for presentation at a second device remote from the first device and a comment time indicative of a time during the audio-visual content to which the comments relates;
  receive timing information from the second device, the timing information indicative of a time during the audio-visual content that is currently being presented at the second device;
  determine a relevant-comment time comprising the comment time plus a relevance threshold time; and wherein
  if the time during the audio-visual content that is currently being presented at the second device is greater than the relevant-comment time, provide signalling to the second device to provide for display of the comment of the comment information with the audio-visual content presented at the second device at a delayed time during the presentation of said audio-visual content, the delayed time later than the relevant-comment time and comprising at least one of:
  a) a time during the audio-visual content at which there is a reoccurrence of a first event in the audio-visual content, the first event having occurred in the audio-visual content at the comment time; and
  b) a time during the audio-visual content at which there is a second event, different to the first event, that is determined to be similar to the first event in the audio-visual content that occurred at the comment time.

In one or more examples, the comment information is associated with the audio-visual content by virtue of one or more of the comment information:
  a) originating from the first device which receives the audio-visual content at the same time as the second device receives the audio-visual content;
  b) originating from a user who is presented with the same audio-visual content by the first device; and
  c) the comment information includes information that specifies it relates to the audio-visual content.

In one or more examples, said reoccurrence of the first event comprises one or both of:
  a replay of the first event that was presented in the audio-visual content at the comment time from the same point of view as it was presented at the comment time; and
  a replay of the first event that was presented in the audio-visual content at the comment time from a different point of view as it was presented at the comment time.

In one or more examples, said time at which there is a reoccurrence of the first event is determined based on at least one of:
  metadata present in the audio-visual content that identifies the reoccurrence of the first event in the audio-visual content;
  a reoccurrence message received with or after receipt of the comment information by the apparatus, the reoccurrence message associated with the comment information and indicative of the time during the audio-visual content of at least one reoccurrence of the first event in the audio-visual content; and
  an output of a neural network, the neural network configured to identify one or more reoccurrences of the first event of the audio-visual content based on the first event of the audio-visual content.

In one or more examples, the second event is determined to be similar to the first event in the audio-visual content based on one or more of:
  metadata present in the audio-visual content that identifies one or more similar second events in the audio-visual content;
  an output of a neural network, the neural network configured to identify one or more similar, second events in the audio-visual content based on the first event of the audio-visual content; and
  a similar event message received with or after receipt of the comment information by the apparatus, the similar event message associated with the comment information, and wherein the similar event message is indicative of the time during the audio-visual content of at least one occurrence of the second event in the audio-visual content.

In one or more example embodiments, the similar event message or the reoccurrence message are received during the receipt of the audio-visual content and at a later time to the receipt of the comment information, the similar event message or reoccurrence message indicative of the time to display the comment after the relevant comment time.

In one or more examples, the means are configured to, if the time during the audio-visual content that is currently being presented at the second device is less than or equal to the relevant-comment time, provide signalling to the second device to provide for display of the comment of the comment information with the audio-visual content presented at the second device at or before the relevant-comment time.

In one or more examples, the audio-visual content comprises one of virtual reality content and visual-and-audio content.

In one or more examples, the means are configured to identify a spatial portion of the audio-visual content at the comment time in which the first event occurs based at least on part on the comment, and wherein the means are configured to determine one or more of the reoccurrence of a first event and the second event based on said identified spatial portion.

In one or more examples, the audio-visual content comprises live audio-visual content and the means are configured to analyse the audio-visual content as it is received to identify one or both of the reoccurrence of the first event and the second event.

In one or more examples, the apparatus comprises, at least in part, the first device.

In one or more examples, the apparatus comprises, at least in part, the second device.

In one or more examples, the first device and the second device each have means configured to:
  receive the audio-visual content; and
  present the received audio-visual content.

In one or more examples, the apparatus comprises, at least in part, a server configured for communication with the first device and the second device.

In a second example aspect there is provided a method, the method comprising:
  receiving comment information from a first device, the comment information associated with audio-visual content and comprises a comment for presentation at a second device remote from the first device and a comment time indicative of a time during the audio-visual content to which the comments relates;
  receiving timing information from the second device, the timing information indicative of a time during the audio-visual content that is currently being presented at the second device;
  determining a relevant-comment time comprising the comment time plus a relevance threshold time; and wherein
  if the time during the audio-visual content that is currently being presented at the second device is greater than the relevant-comment time, providing signalling to the second device to provide for display of the comment of the comment information with the audio-visual content presented at the second device at a delayed time during the presentation of said audio-visual content, the delayed time later than the relevant-comment time and comprising at least one of:
  a) a time during the audio-visual content at which there is a reoccurrence of a first event in the audio-visual content, the first event having occurred in the audio-visual content at the comment time; and
  b) a time during the audio-visual content at which there is a second event, different to the first event, that is determined to be similar to the first event in the audio-visual content that occurred at the comment time.

In a third example aspect there is provided a computer readable medium comprising computer program code stored thereon, the computer readable medium and computer program code being configured to, when run on at least one processor, perform the method of:
  receiving comment information from a first device, the comment information associated with audio-visual content and comprises a comment for presentation at a second device remote from the first device and a comment time indicative of a time during the audio-visual content to which the comments relates;
  receiving timing information from the second device, the timing information indicative of a time during the audio-visual content that is currently being presented at the second device;
  determining a relevant-comment time comprising the comment time plus a relevance threshold time; and wherein
  if the time during the audio-visual content that is currently being presented at the second device is greater than the relevant-comment time, providing signalling to the second device to provide for display of the comment of the comment information with the audio-visual content presented at the second device at a delayed time during the presentation of said audio-visual content, the delayed time later than the relevant-comment time and comprising at least one of:
  a) a time during the audio-visual content at which there is a reoccurrence of a first event in the audio-visual content, the first event having occurred in the audio-visual content at the comment time; and
  b) a time during the audio-visual content at which there is a second event, different to the first event, that is determined to be similar to the first event in the audio-visual content that occurred at the comment time.

In a fourth example aspect there is provided a second apparatus comprising means configured to:
  receive audio-visual content;
  present the received audio-visual content;
  receive comment information associated with the audio-visual content during the presentation of the received audio-visual content, the comment information comprising a comment and a comment time indicative of a time during the audio-visual content to which the comments relates;
  determine a relevant-comment time comprising the comment time plus a relevance threshold time; and wherein
  if the time during the audio-visual content that is currently being presented is greater than the relevant-comment time, provide for display of the comment of the comment information with the audio-visual content at a delayed time during the presentation of the received audio-visual content, the delayed time later than the relevant-comment time and comprising at least one of:
  a) a time during the presentation of the audio-visual content at which there is a reoccurrence of a first event in the audio-visual content, the first event having occurred in the audio-visual content at the comment time; and
  b) a time during the presentation of the audio-visual content at which there is a second event, different to the first event, that is determined to be similar to the first event in the audio-visual content that occurred at the comment time.

In a fifth example aspect there is provided an apparatus comprising:
  at least one processor; and
  at least one memory including computer program code,
  the at least one memory and the computer program code configured to, with the at least one processor, cause the apparatus to perform at least the following:

receive comment information from a first device, the comment information associated with audio-visual content and comprises a comment for presentation at a second device remote from the first device and a comment time indicative of a time during the audio-visual content to which the comments relates;

receive timing information from the second device, the timing information indicative of a time during the audio-visual content that is currently being presented at the second device;

determine a relevant-comment time comprising the comment time plus a relevance threshold time; and wherein if the time during the audio-visual content that is currently being presented at the second device is greater than the relevant-comment time, provide signalling to the second device to provide for display of the comment of the comment information with the audio-visual content presented at the second device at a delayed time during the presentation of said audio-visual content, the delayed time later than the relevant-comment time and comprising at least one of:

a) a time during the audio-visual content at which there is a reoccurrence of a first event in the audio-visual content, the first event having occurred in the audio-visual content at the comment time; and b) a time during the audio-visual content at which there is a second event, different to the first event, that is determined to be similar to the first event in the audio-visual content that occurred at the comment time.

The present disclosure includes one or more corresponding aspects, examples or features in isolation or in various combinations whether or not specifically stated (including claimed) in that combination or in isolation. Corresponding means and corresponding functional units (e.g., function enabler, audio-visual content renderer, comment presenter, display device) for performing one or more of the discussed functions are also within the present disclosure.

Corresponding computer programs for implementing one or more of the methods disclosed are also within the present disclosure and encompassed by one or more of the described examples.

The above summary is intended to be merely exemplary and non-limiting.

BRIEF DESCRIPTION OF THE FIGURES

A description is now given, by way of example only, with reference to the accompanying drawings, in which.

DESCRIPTION OF EXAMPLE ASPECTS

When consuming audio-visual content it is common for users or "consumers" of said content to make comments. The comments may be text-based comments or audio-based comments, such as spoken comments, or video comments or comments made by any other electronic media type or a combination of any of the above commenting types. One or more embodiments herein relate to comments of these and other types. When users are in different locations consuming the same audio-visual content, it is desirable to provide for communication of the comments between users to provide a social experience. However, there may be timing issues between the user's user devices due to differences in the delay in transmission and/or rendering of the audio-visual content for the different users and/or delays in the communication of comments between users. If the comments are time-sensitive, such as if the comments are relevant to the recipient/content if they are presented within a particular temporal portion of the audio-visual content but are less relevant (or not relevant) if presented outside the temporal portion, then the effective presentation of comments may be both important and problematic. The temporal portion may be considered as a "relevant temporal portion" which is only a part of the audio-visual content.

The audio-visual content, in one or more embodiments, may comprise video content, such as 2D or 3D video content, audio-only content, image-only content e.g. video content with no audio, or virtual reality content. Virtual reality content may be considered to include augmented reality content and mixed reality content.

Virtual reality (VR) may use a VR display comprising a headset, such as glasses or goggles or virtual retinal display, or one or more display screens that surround a user to provide the user with an immersive virtual experience. A virtual reality apparatus, which may or may not include the VR display, may provide for presentation of VR content representative of a virtual reality scene to a user to simulate the user being present within the virtual reality scene. Accordingly, in one or more examples, the VR apparatus may provide signalling to a VR display for display of the VR content to a user while in one or more other examples, the VR apparatus may be part of the VR display, e.g. part of the headset. The virtual reality scene may therefore comprise the VR content displayed within a three-dimensional virtual reality space so that the user feels immersed in the scene, as if they were there, and may look around the VR space at the VR content displayed around them. The virtual reality scene may replicate a real-world scene to simulate the user being physically present at a real world location or the virtual reality scene may be computer generated or a combination of computer generated and real world multimedia content. Thus, the VR content may be considered to comprise the imagery (e.g. static or video imagery), audio and/or accompanying data from which a virtual reality scene may be generated for display. The VR apparatus may therefore provide the VR scene by generating the virtual, three-dimensional, VR space in which to display the VR content. The virtual reality scene may thus have a wide field of view in that it has a spatial extent greater than a field of view that may be provided for display to a user at any one time.

As the VR scene is typically larger than a portion a user can view with the VR display, the VR apparatus may provide, for display on the VR display, the virtual reality view of the VR scene to a user, the VR view showing only a spatial portion of the VR content that is viewable at any one time. The VR apparatus may provide for panning around of the VR view in the VR scene based on movement of a user's head and/or eyes.

Augmented reality (AR) may use an AR display, such as glasses or goggles or a virtual retinal display, to augment a view of the real world (such as seen through the glasses or goggles) with computer generated content. An augmented reality apparatus, which may or may not include an AR display, may provide for presentation of multimedia AR content configured to be overlaid over the user's view of the real-world. Thus, a user of augmented reality may be able to view the real world environment around them, which is augmented or supplemented with content provided by the augmented reality apparatus, which may be overlaid on their view of the real world and/or aurally overlaid over an aural real world scene they can hear. The content may comprise multimedia content such as pictures, photographs, video, diagrams, textual information, aural content among others. Thus, while augmented reality may provide for direct viewing of the real world with the addition of computer generated graphics and/or audio content, a user of virtual reality may only be able to see content presented on the VR display of the virtual reality apparatus substantially without direct viewing of the real world. One or more examples herein may relate to the provision of content comprising augmented reality content.

Mixed reality is similar to augmented and virtual reality and includes the use of a three-dimensional model of the real-world environment to enable virtual objects, including visual and audio objects, to appear to interact with real-world objects in terms of one or more of their movement, presentation (e.g. audible presentation) and appearance. Mixed reality may be considered as a subset of virtual reality and a subset of augmented reality.

Spatial audio comprises audio presented in such a way to a user that it is perceived to originate from a particular location, as if the source of the audio was located at that particular location. Spatial audio content comprises audio for presentation as spatial audio and, as such, typically comprises audio having directional information (either explicitly specified as, for example, metadata or inherently present in the way the audio is captured), such that the spatial audio content can be presented such that its component audio is perceived to originate from one or more points or one or more directions in accordance with the directional information.

Thus, virtual reality content may be provided with spatial audio having directional properties, such that the audio is perceived to originate from a point in the VR space, which may be linked to the imagery of the VR content. Augmented or mixed reality content may be provided with spatial audio, such that the spatial audio is perceived as originating from real world objects visible to the user and/or from augmented reality graphics overlaid over the user's view. Spatial audio may be presented independently of visual virtual reality or visual augmented reality content. The spatial positioning of the spatial audio may be provided by 3D audio effects, such as those that utilise a head related transfer function to create a spatial audio space (aligned with a real-world space in the case of augmented reality) in which audio can be positioned for presentation to a user. Spatial audio may be presented by headphones by using head-related-transfer-function (HRTF) filtering techniques or, for loudspeakers, by using vector-base-amplitude panning techniques to position the perceived aural origin of the audio content. In other embodiments ambisonic audio presentation may be used to present spatial audio. However, in general, spatial audio may use one or more of volume differences, timing differences and pitch differences between audible presentation to each of a user's ears to create the perception that the origin of the audio is at a particular location or in a particular direction in space. The perceived distance to the perceived origin of the audio may be rendered by controlling the amount of reverberation and gain to indicate closeness or distance from the perceived source of the spatial audio. It will be appreciated that spatial audio presentation as described herein may relate to the presentation of audio with only a perceived direction towards its origin as well as the presentation of audio such that the origin of the audio has a perceived location, e.g. including a perception of distance from the user. The audio-visual content described herein may, in one or more embodiments, include spatial audio content.

Figure 1:
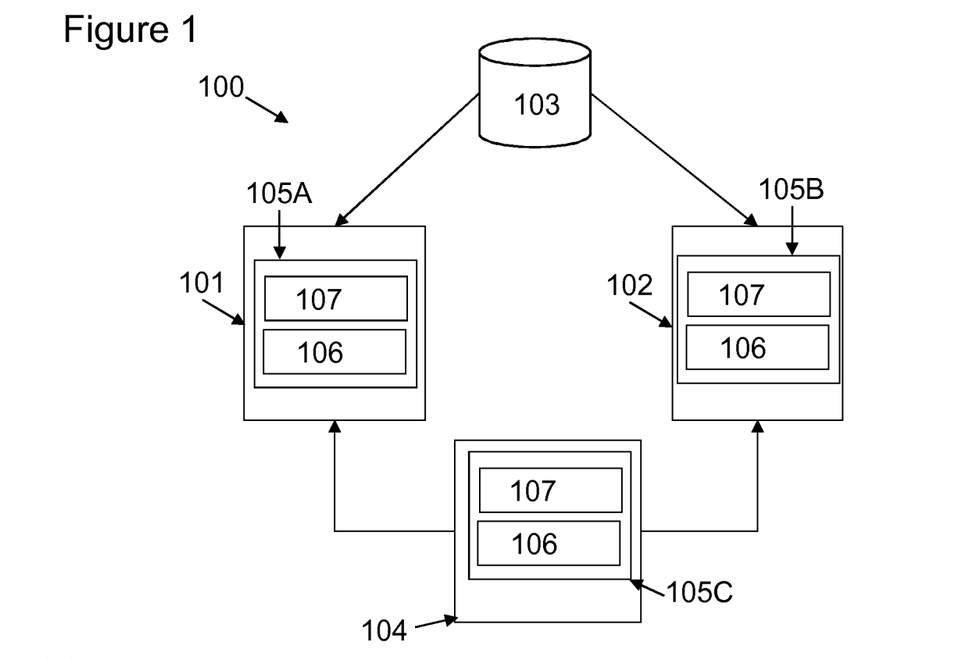
FIG. 1 illustrates an example system showing several example embodiments of an apparatus for providing for presentation of comments.

FIG. 1 shows an example system 100 for presentation of audio-visual content and for the communication of comments between users of devices. In particular, the system 100 comprises first device 101 and a second device 102. The first and second device may comprise a device on which a respective user consumes audio-visual content and may make one or more comments thereabout for receipt by the respective other user. The system 100 may further include a content server 103, or more generally one or more content servers, for providing the audio-visual content to the first device 101 and to the second device 102. The content server 103 may provide the audio-visual content to the first device 101 and to the second device 102 at substantially the same time. The system 100 further includes an interaction server 104, which may be configured to provide for the sending of comments between users of the devices 101, 102.

We disclose an apparatus 105 that provides for communication and/or presentation of comments as will be described below. The apparatus 105 may be embodied in any one of the first device 101, the second device 102, or the server 104. In one or more examples, the apparatus 105 may be distributed over any two or more of the first device 101, the second device 102 and the server 104. As such, the apparatus 105 is shown as apparatus 105A when it comprises at least part of the first device 101, 105B when it comprises at least part of the second device 102, and 105C when it comprises at least part of the server 104. It will also be appreciated that, in one or more examples, the server 104 and the content server 103 may comprise the same server.

The apparatus 105A-C may comprise or be connected to a processor 106 and a memory 107 and may be configured to execute computer program code. The apparatus 105A-C may have only one processor 106 and one memory 107 but it will be appreciated that other embodiments may utilise more than one processor and/or more than one memory (e.g. same or different processor/memory types). Further, the apparatus 105A-C may be an Application Specific Integrated Circuit (ASIC).

The processor may be a general purpose processor dedicated to executing/processing information received from other components, such as from server 104 and content server 103, in accordance with instructions stored in the form of computer program code in the memory. The output signalling generated by such operations of the processor is provided onwards to further components, such as to the first device 101 or the second device 102 or to a display or speaker thereof.

The memory 107 (not necessarily a single memory unit) is a computer readable medium (solid state memory in this example, but may be other types of memory such as a hard drive, ROM, RAM, Flash or the like) that stores computer program code. This computer program code stores instructions that are executable by the processor, when the program code is run on the processor. The internal connections between the memory and the processor can be understood to, in one or more example embodiments, provide an active coupling between the processor and the memory to allow the processor to access the computer program code stored on the memory.

In this example, the respective processors and memories are electrically connected to one another internally to allow for electrical communication between the respective components. In this example, the components are all located proximate to one another so as to be formed together as an ASIC, in other words, so as to be integrated together as a single chip/circuit that can be installed into an electronic device. In some examples one or more or all of the components may be located separately from one another.

In this example, the processor 106 and memory 107 is shared with any other functionality performed by the first/second device 101, 102 or server 104, but in other examples, there may be dedicated processor(s) and/or memory provided.

As mentioned above to implement a social audio-visual/VR content experience there may be timing issues to overcome that are based on at least the following:
   Multi-user social interaction synchronization (e.g. the transmission and processing of the comment between user devices); and
   Synchronization of the social interaction with the consumed audio-visual content (e.g. ensuring the comment is still relevant to the audio-visual content currently being consumed)

Thus, if a comment by a user about the audio-visual content is delayed relative to another user also consuming the same audio-visual content (e.g., the same sports game) above a threshold level, it may result in the interaction or comment becoming less relevant or even distracting. The delays may be due to:
   A delay in the reception of the content by the first device relative to the second device resulting in a delayed comment being delivered.
   A delay in the reception of comment provided by one user to the other by virtue of transmission delays in a commenting service provided by the server 104.

Figure 2:
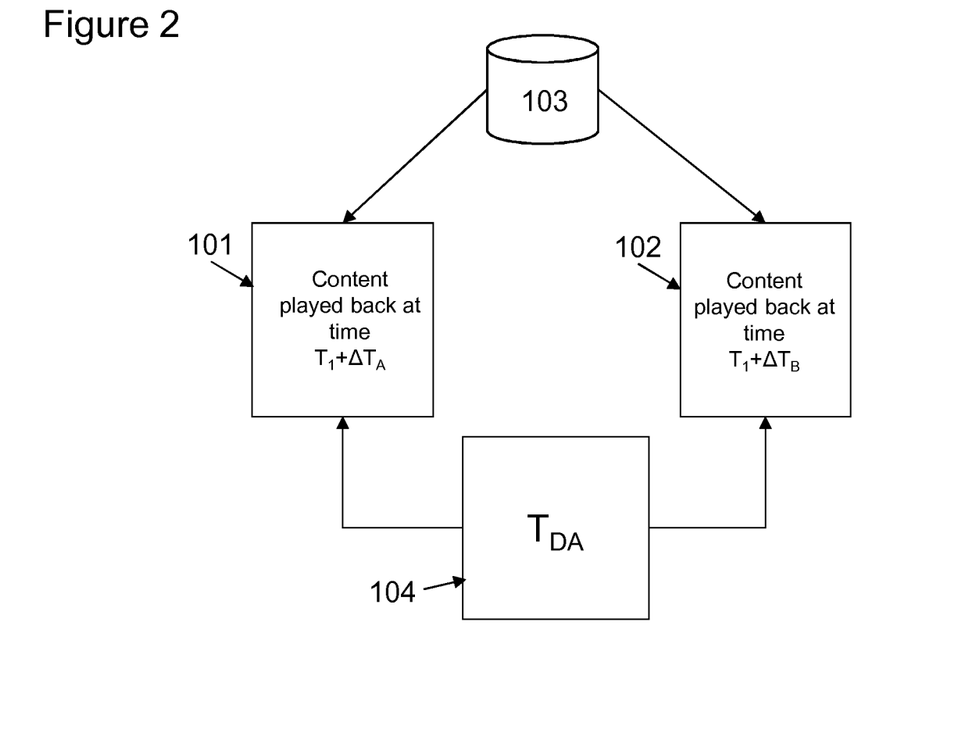
FIG. 2 illustrates the example system of FIG. 1 with possible components of differing delays in the system.

With reference to FIG. 2, the content server 103 may provide audio-visual content to both the first device 101 and the second device 102. Due to network delays, such as delays in the transmission of the audio-visual content from the content server 103 over the Internet to the first/second device 102, 103, the audio-visual content may arrive at the first/second device 101, 102 at different times. Further, the first and second devices 101, 102 may have different processing capabilities and they may process and begin to render the received audio-visual content at different times. Thus, the audio-visual content may be provided for display by the first device 101 and the second device 102 at the same time, i.e. co-presented, but the time during the audio-visual content (e.g. the time determined relative to the running time of the audio-visual content) that is displayed at each device 101, 102 may be offset due to differences in the above-mentioned delays. Thus, the audio-visual content presented at the first device 101 may be considered to be presented at time $T_1+\Delta T_A$, where $T_1$ is the elapsed time through the content and $\Delta T_A$ represents the playback delay between the content server 103 and the first device 101. Likewise, the audio-visual content presented at the second device 102 may be considered to be presented at time $T_1+\Delta T_B$, where $\Delta T_B$ represents the playback delay between the content server 103 and the second device 102. $\Delta T_A$ and $\Delta T_B$ may comprise different delays and therefore a comment about an occurrence in the audio-visual content currently presented on one device that is transmitted between the devices 101, 102 may not be in time synchrony with the audio-visual content currently presented on the other device 101, 102. Further, the delay introduced by the transmission of comments between devices 101, 102 may be shown as $T_{DA}$.

Accordingly, a comment or "interaction" may become available to the first device 101 from the second device at a time $T_1+\Delta T_B+T_{DA}$. Likewise, a comment or "interaction" may become available to the second device 102 from the first device 101 at a time $T_1+\Delta T_A+T_{DA}$.

Given the above-mentioned time delays, the apparatus 105 may be required to determine if, at the time $T_1+\Delta T_A+T_{DA}$ or $T_1+\Delta T_B+T_{DA}$, the comment is still relevant for display at the intended recipient device 101, 102.

The following considers the functionality of the apparatus 105 in more detail. Firstly, we consider the apparatus 105B implemented at the second device 102 and wherein a comment originates from the first device 101 or an equivalent apparatus thereof. However, it will be appreciated that the functionality of the apparatus 105B described herein is substantially similar when the apparatus 105A, 105C is alternatively embodied in the first device 101 or server 104 or distributed over a plurality of entities.

In the context of the first device 101 and the second device 102 receiving the same audio-visual content but potentially presenting that audio-visual content for respective users at different times, the apparatus 105 may be configured to receive comment information from the first device 101. The comment information may be received directly from the first device 101 or via the server 104. Further, in one or more examples, a different device to the one displaying the audio-visual content (e.g. a TV) may be used for commenting (e.g. a mobile telephone). Thus, the first user of the first device 101 may watch the audio-visual content on their TV but comment through their mobile telephone, although it will be appreciated that there may be at least a time association between what is presented and when the comment is made so that comment information can be provided as described. Accordingly, the first device 101 or second device 102 may represent an arrangement of devices, such as the TV and mobile telephone operating together.

The second device 102 may also be configured to receive the audio-visual content and present the received audio-visual content and therefore the apparatus 105B may be configured to receive said comment information during the presentation of the audio-visual content.

The comment information is associated with the audio-visual content because the author of the comment (e.g. the user of the first device 101) is co-watching the audio-visual content. However, the comment information may be considered to be associated with the audio-visual content by virtue of one or more of the comment information:

a) originating from the first device 101 which receives the audio-visual content at the same time as the second device 102 receives the audio-visual content;
b) originating from a user who is presented with the same audio-visual content by the first device 101; and
c) the comment information includes information that specifies it relates to the audio-visual content.

Accordingly, the comment information may contain information that identifies the audio-visual content as being the subject of the comment that is being co-consumed by the user of the first device 101 and the user of the second device 102.

The comment information itself may comprise a comment (e.g. text-based, audio-based, video-based etc) for presentation at the second device 102 and a comment time indicative of a time during the audio-visual content to which the comments relates. Thus, the user of the first device 101 may be consuming the audio-visual content and may witness a first event in the audio-visual content that elicits the making and sending of the comment to the second device 102. The comment time may be indicative of the time, during the audio-visual content presented at the first device 101, at which the comment was submitted (which may be shortly after the first event given the time required to create the comment) or may be indicative of the time of the first event (which may be determined automatically based on analysis of the comment or by user input).

The apparatus 105B may receive timing information from the second device 102, wherein the timing information is indicative of a time during the audio-visual content that is currently being presented at the second device 102. Thus, in embodiments where the apparatus 105B is part of the second device 102 and wherein the apparatus 105 also performs the presentation of the audio-visual content, the receiving of the time information may occur internally of the second device 102. In other examples, the apparatus 105 may be embodied in the second device 102 but as a different logical entity and therefore the receiving of the timing information may involve the sending and receipt of the timing information between the logical entity responsible for presenting the audio-visual content and the apparatus 105B.

The apparatus 105 may be configured to determine a relevant-comment time. The relevant comment time may be considered to be a time relative to the audio-visual content after which the comment is no longer relevant. Thus, the relevant-comment time may be considered to be the expiry time of the comment relative to the occurrence of the first event. The relevant-comment time comprises the comment time received in the comment information plus a relevance threshold time. The relevance threshold time may comprise a predetermined period of time, such as a fixed period of time, which may be less than 30 seconds, less than 20 second or less than 10 seconds. Accordingly, in one or more examples, the comment of the comment information may be considered to be a relevant comment for perhaps twenty seconds after it was made or after the first event. In other examples, the relevance threshold time may be based on the comment itself. The apparatus 105 or other apparatus which reports to the apparatus 105 may analyse the content of the comment to determine for how long the comment is relevant. The analysis may include determining a rate of occurrence of the first event in the audio-visual content. Thus, if the first event was a goal in football, which tends to be lower scoring, and the comment was "Great goal", then the apparatus may assign a greater relevance threshold time because the content of the comment indicates it relates to a first event comprising a goal and the occurrence of goals in the audio-visual content is relatively low. Thus, displaying a comment relating to a goal after the first event is unlikely to be confused with a possible subsequent goal. In a second example, if the first event was a particular backhand shot in a game of tennis, which tends happen fairly frequently, and the comment was "Great backhand", then the apparatus may assign a lower relevance threshold time because the content of the comment indicates it relates to a first event comprising a backhand shot and the occurrence of such shots in the audio-visual content may be determined to be relatively high. In one or more examples, the determination of the relevant-comment time may be based on information from the first device 101. Accordingly, the first user or first user device may determine the relevance threshold time and thus, the apparatus 105B may be configured to receive information indicative of the relevance threshold time from the first device 101.

The apparatus 105B may then be configured to determine if the comment should be presented based on its relevant-comment time given what time point in the audio-visual content is currently being presented at the second device 102. As will be recalled, there may be a time offset between what has been seen and commented on at the first device 101 and what is currently being presented at the second device 102 despite the audio-visual content being consumed, at least in a partially temporally overlapping respect, at the same time.

Thus, if the elapsed time during the audio-visual content that is currently being presented at the second device 102 is less than or equal to the relevant-comment time, then the comment may be deemed sufficiently relevant to present. Accordingly, the apparatus 105 may provide signalling to the second device 102 to provide for display of the comment of the comment information with the audio-visual content presented at the second device at or before the relevant-comment time. Thus, in one or more examples, based on said signalling, the comment may be provided for presentation at the second device 102 at a time after the comment time and at or before the elapse of the relevance threshold time thereafter. The apparatus 105B, being part of the second device 102, may in one or more examples, display the comment or provide for a different entity, such as a different part of the second device 102, to display the comment.

If the comment is a video or audio comment or any other comment type that requires its progressive display over time, the apparatus 105 may provide signalling to the second device 102 to provide for beginning the display of the comment of the comment information with the audio-visual content presented at the second device at or before the relevant-comment time, even if the duration of the comment may lead it to be displayed after the relevant-comment time. In other embodiments, the apparatus may provide the signalling based on the comment being displayed and so that its display is completed by the relevant-comment time.

However, if the comment is deemed no longer to be relevant given the time point that is currently being presented at the second device 102, different action may be taken.

In particular, if the elapsed time during the audio-visual content that is currently being presented at the second device is greater than the relevant-comment time, that is the time during which the comment is deemed relevant has been and gone, the comment may be saved for presentation at a later, delayed time. Thus, the apparatus 105B may provide signalling to the second device 102 to provide for display of the comment of the comment information with the audio-visual content presented at the second device 102 at a delayed time during the presentation of said audio-visual content, the delayed time later than the relevant-comment time and comprising at least one of:

a) a time during the audio-visual content at which there is a reoccurrence of a first event in the audio-visual content, the first event having occurred in the audio-visual content at the comment time; and b) a time during the audio-visual content at which there is a second event, different to the first event, that is determined to be similar to the first event in the audio-visual content that occurred at the comment time.

The apparatus 105B, being part of the second device 102, may in one or more examples, display the comment at the delayed time or provide for a different entity, such as a different part of the second device 102, to display the comment at the delayed time.

Thus, rather than discard comments that are deemed not to be relevant because too much time has elapsed (a relevance threshold amount of time) since the comment time, the apparatus 105B is configured to identify a delayed time at which to present the comment such that the comment is once again relevant to the audio-visual content without interrupting the continuity of the audio-visual content presented at the second device 102. Thus, no "rewinding" of the audio-visual content presented at the second device may be required in order to determine the aforementioned delayed time—the apparatus 105B is configured to determine delayed time as a time during the audio-visual content after the relevant comment time. Thus, the delayed time is based on said reoccurrence of the first event or a similar second event. The comment of the comment information may be considered to be context dependent wherein that context is provided by the audio-visual content and, in particular, the first event having "recently" occurred in the audio-visual content presented at the second device. The comment may therefore also be considered to be time-sensitive because the audio-visual content may be being presented at substantially the same time at the first device 101 and second device 102 subject to at least one or more of different transmission and rendering delays and comment processing delays. The presentation of the comment at the delayed time may be advantageous when presenting the context-dependent and, as such, time-sensitive comments in a system subject to the aforementioned technical delays.

The reoccurrence of the first event may comprise a replay of the first event that was presented in the audio-visual content at or around the comment time from the same point of view as it was presented at the comment time. Thus, the audio-visual content may contain a repetition of the same content of the first event at a later time during the audio-visual content in the form of an "action replay" or the like. Such a reoccurrence of the first event may be present in a slow-motion form and/or with additional graphics or overlays to indicate it is a replay or with other ancillary content, such a different audio commentary, but may comprise, at least in part, a reoccurrence of the first event. Accordingly, the comment may be saved and first displayed at the second device 102 at the delayed time comprising the reoccurrence of the first event.

In one or more examples, the reoccurrence of the first event may comprise a replay of the first event that was presented in the audio-visual content at or around the comment time but from a different point of view as it was presented at the comment time. Thus, the same goal in a game of football may be repeated but shown from a different camera angle. Accordingly, despite the imagery of the audio-visual content being different, the audio-visual content at the delayed time may comprise audio-visual content of the same first event. Thus, the comment may be saved and first displayed at the delayed time comprising the reoccurrence of the first event from the different point of view.

In some audio-visual content there may be a degree of repetition in terms of what occurs in the audio-visual content. For example, a music video of a song will have a repetition of the chorus of the song or a particular dance move performed by a dancer appearing in the music video. Thus, even if there is not a reoccurrence of the first event, there may be a second event that is sufficiently similar that provides an opportune time to present the comment with the audio-visual content such that the comment has the supporting context of the second event in the audio-visual content. Thus, continuing the above examples, if the comment is "I love this chorus" but the comment is received at the second device 102 after the relevant-comment time and is therefore saved for later presentation at the delayed time, the delayed time may comprise the next occurrence of the chorus i.e. a second event (the second occurrence of the chorus in the song) similar to the first event (the first occurrence of the chorus in the song). As another example, if the comment is "I wish I could moonwalk" but the comment is received at the second device 102 after the relevant-comment time (e.g. the relevance threshold time after the moonwalk scene has been presented) and is therefore saved for later presentation at the delayed time, the delayed time may comprise the next occurrence of the performer in the music video performing the moonwalk, i.e. a second event (the second occurrence of the moonwalk dance move) similar to the first event (the first occurrence of the moonwalk dance move).

Figure 3:
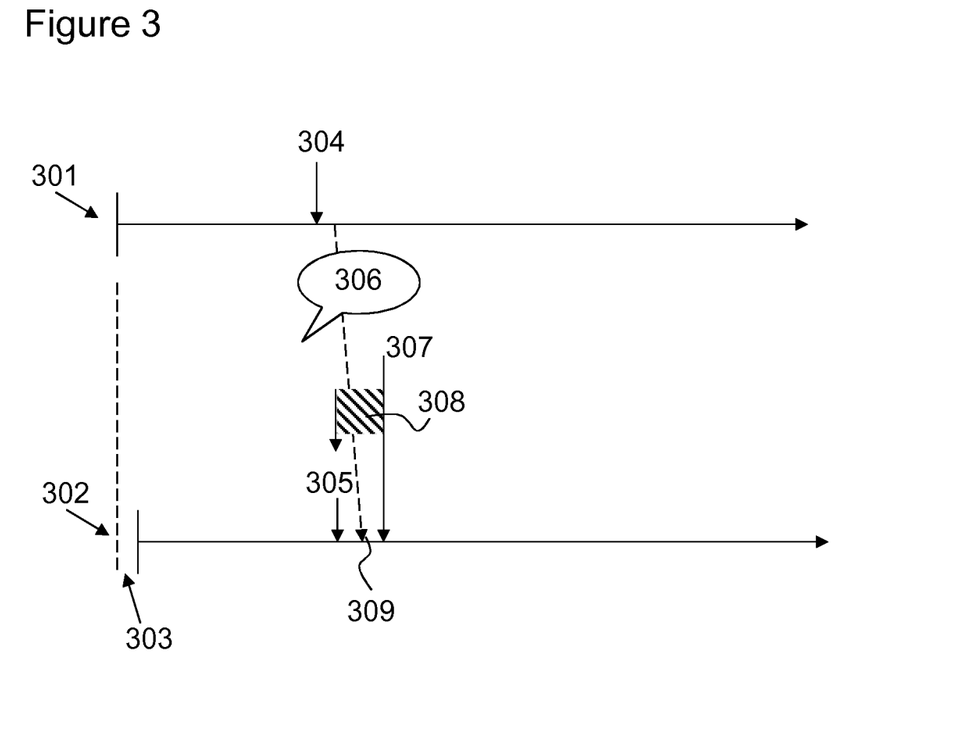
FIG. 3 illustrates example time lines showing the presentation of the same audio-visual content at the first and second device when it is determined that the comment time is earlier than the relevant comment time.

FIG. 3 illustrates the timely receipt of the comment and its prompt display. FIG. 3 shows a pair of timelines illustrating the progression of the audio-visual content at the first device 101 at 301 and at the second device 102 at 302. There is a temporal offset, caused by the aforementioned delays, between the times that corresponding content is presented at each of the first device 101 and the second device at 302, shown by time difference 303. The first event occurs at time point $T_1$ during the audio-visual content shown at 304 at the first device 101 and at the corresponding later time point 305 at the second device 102. The first device 101 sends a comment 306 about the first event to the second device 102, such as via server 104. The comment time associated with the comment may designate time $T_1$. Thus, the apparatus 105 may determine the relevant comment time shown at 307 based on the time point 305 plus the relevance threshold time represented by hashed box 308. In this example of FIG. 3, the current time 309, which may comprise the time the comment 306 is received and ready for presentation, is less than the relevant comment time 307. Accordingly, the comment 306 may be presented at the second device 102, such as immediately or any time between current time 309 and the relevant comment time 307.

Figure 4:
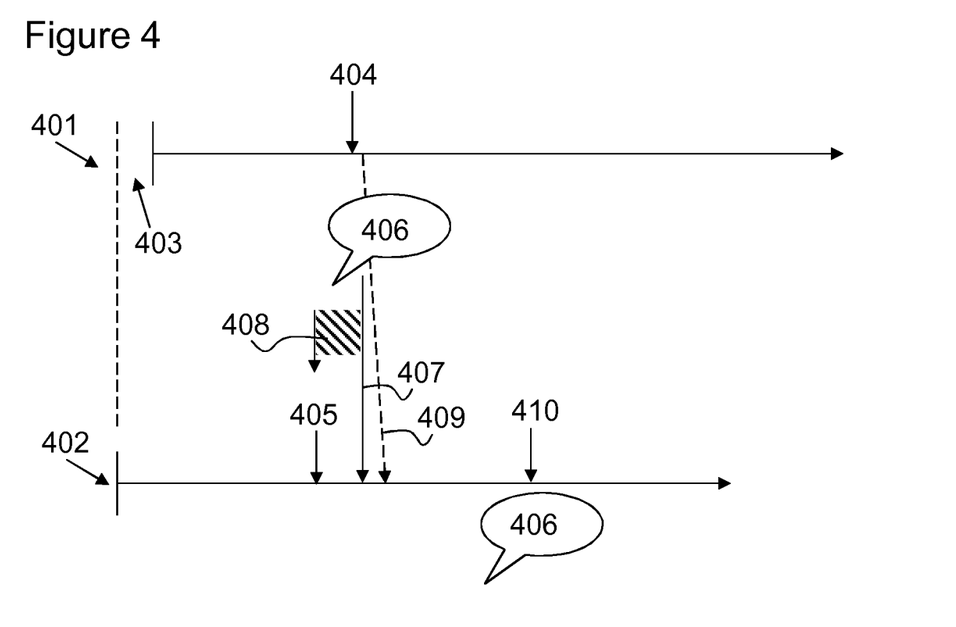
FIG. 4 illustrates example time lines showing the presentation of the same audio-visual content at the first and second device when it is determined that the comment time is later than the relevant comment time.

FIG. 4 illustrates the delayed receipt of the comment and its display at a later, delayed time. FIG. 4 also shows the pair of timelines 401, 402 illustrating the progression of the audio-visual content at the first device 101 at 401 and at the second device 102 at 402. There is a temporal offset, caused by the aforementioned delays, between the times that corresponding content is presented at each of the first device 101 and the second device at 102, shown by time difference 403, which in this example differs from that 303 of FIG. 3 because the content is shown later at the first device 101. The first event occurs at time point $T_1$ shown at 404 at the first device 101 and at an earlier time point 305 at the second device 102. The first device 101 sends a comment 406 about the first event to the second device 102, such as via server 104. The comment time associated with the comment may designate time $T_1$. Thus, the apparatus 105 may determine the relevant comment time shown at 407 based on the time point 405 plus the relevance threshold time represented by hashed box 408. In this example of FIG. 4, the current time 409, which may comprise the time the comment 406 is received and ready for presentation, is greater than the relevant comment time 407. Accordingly, the comment 406 may not be displayed and may be saved for presentation at the delayed time. In particular, a delayed time comprising either a reoccurrence of the first event or a similar second event may be identified at time point 410 later than the relevant comment time 407 and current time 409 during the audio-visual content. The comment 406 may therefore be displayed for the first time at the delayed time point 410.

Figure 5:
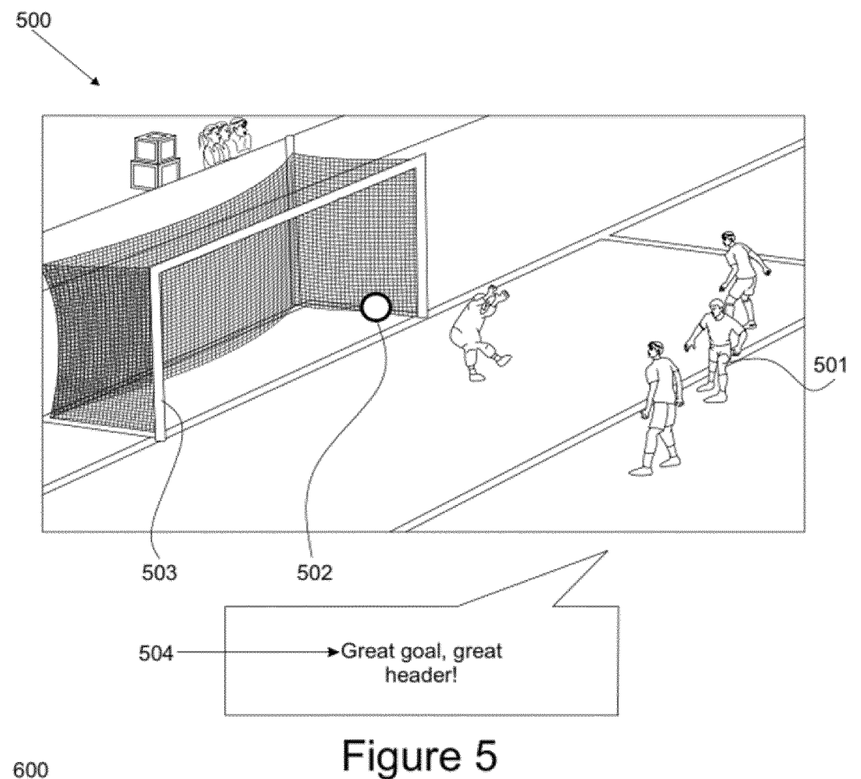
FIG. 5 shows an example first screen shot of the audio-visual content at the time of the making of a comment at the first device, which is shortly after the actual occurrence of the first event.
Figure 6:
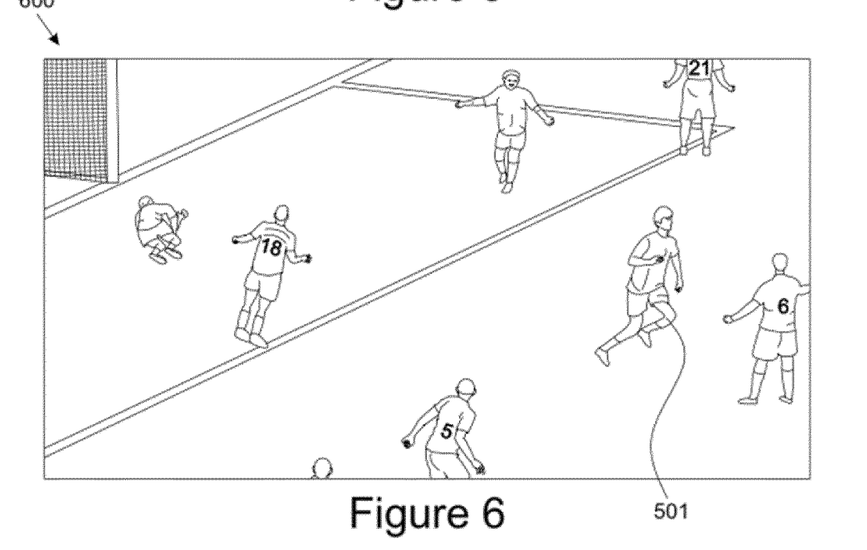
FIG. 6 shows an example second screen shot of the audio-visual content at the time the comment is received or ready for display at the second device.
Figure 7:
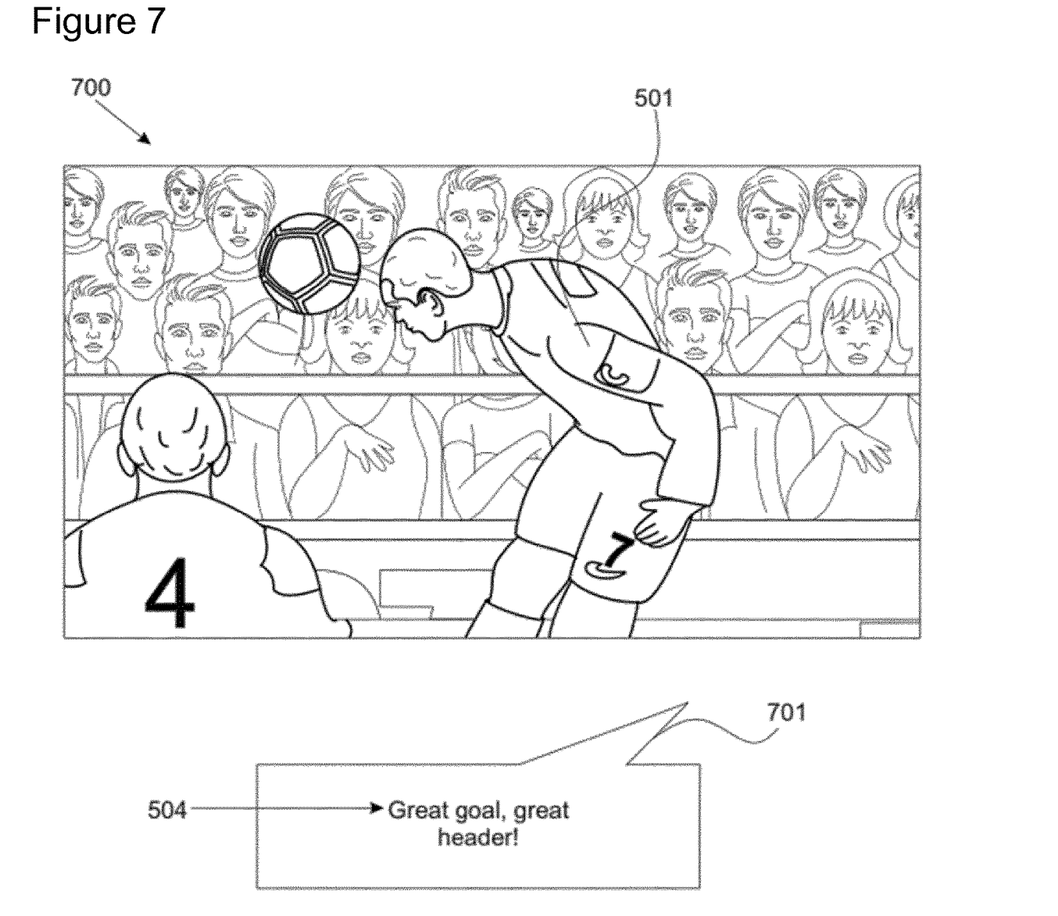
FIG. 7 shows an example third screen shot of the audio-visual content at the delayed time at the second device at which time the comment is presented.

FIGS. 5 to 7 show a further example with illustrated audio-visual content comprising a football match. FIG. 5 shows a screen shot 500 of the audio-visual content presented at the first device 101 to a first user. The screen shot depicts a player 501 having just headed the ball 502 into the goal 503. It will be appreciated that there is likely to be a user reaction-time before the comment is made after the occurrence of an event. This heading of the ball into the goal may be considered to comprise the first event. The user of the first device 101 makes a comment 504 comprising "Great goal, great header!", which may form the comment of the comment information along with the time it was made or the time of the first event as the comment time (if the first device 101 or other apparatus has the functionality to determine the time of the first event based on the semantic analysis of the comment or a time input by the user). The comment information may then be sent to the second device, such as via server 104.

FIG. 6 shows a screen shot 600 of the audio-visual content presented at the second device 102 to a second user. The screen shot 600 may be from a time that the comment 504 is received and ready for display (e.g. it has undergone any relevant processing). As described above, various delays may mean that the audio-visual content presented to the second user at this time may not be sufficiently time-aligned for the comment 504 to be relevant to the context of the audio-visual content currently presented. Screen shot 600 shows the player 501 beginning to make their way away from goal after the goal has been scored. Accordingly, it may be that the comment 504 is ready for display after the relevance threshold time since the first event as presented to the second user at the second device 102. The comment 504 may therefore not be displayed and may be saved for display at the delayed time.

FIG. 7 shows a screen shot 700 presented to the second user at the second device 102 later during the audio-visual content when a replay of the same goal is shown, i.e. a reoccurrence of the first event. Thus, once it was determined that the comment 504 was too late to be displayed, the apparatus 105 was configured to continue to present the audio-visual content without interruption to the time continuity (e.g. did not rewind the content) and a delayed time was determined for the presentation of the comment 504.

It will be appreciated that the replay shown in screen shot 700 is zoomed in compared to how the audio-visual content depicted the first event at the time of the first event. Nevertheless, the replay comprises a reoccurrence of the first event. Accordingly, the time of the replay is determined to be the delayed time and accordingly, the comment 504 is presented at the delayed time as shown at 701.

We now consider a plurality of examples of how the delayed time may be determined.

Figure 8:
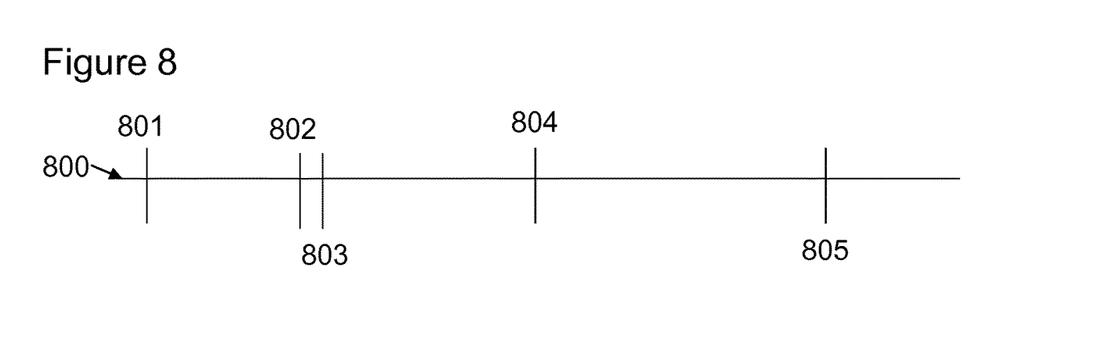
FIG. 8 shows example metadata which may be used to determine the delayed time.

In one or more examples, the audio-visual content may have been pre-processed to identify one or more first events and any reoccurrences of those first events that appear later in the audio-visual content. FIG. 8 illustrates a timeline 800 representative of the progression of the audio-visual content with time. The audio-visual content may be provided with metadata comprising time stamped labels 801-805 that uniquely identify events and any reoccurrences thereof, so that the labels can be searched to identify when a reoccurrence of the first event will occur. For example, the apparatus 105 may be configured to identify one of the labels 801, termed the first event label, that is the most recent label prior to the comment time. If the comment arrives at the second device 102 too late to be displayed, a search of the other labels 802-805 to find a counterpart to the first event label 801 may be performed to identify the delayed time point at which a reoccurrence occurs. The comment may then be first displayed at a time indicated by the counterpart label, i.e. the delayed time. In this example, labels 802 and 803 may comprise two different replays or reoccurrences of the first event at 801. Labels 804 and 805 may indicate similar second events of the first event 801. It will be appreciated that other "first events" not related to the first event 801 may also be included in the metadata.

In one or more examples, the apparatus 105 may not be required to search the audio-visual content or the audio-visual content may not include metadata. If the audio-visual content was live content it may not be possible to pre-process it to determine the metadata. Thus, in one or more examples, the apparatus 105 may be configured to receive a reoccurrence message received with or after receipt of the comment information by the apparatus 105B. The reoccurrence message may be received from the apparatus 105A, 105C, the first device 101 or the server 104 or any other entity given the responsibility to identify delayed times. The apparatus 105 may be configured to, if it is determined that the comment is to be displayed at a later (not yet known) delayed time, send a request to receive the reoccurrence message so that the apparatus 105 can be informed of the delayed time. Thus, the reoccurrence message may provide the delayed time to the apparatus 105 so that the comment can be displayed later.

In one or more examples, content analysis, which may include object/image/audio recognition of the audio-visual content, may be performed to identify any reoccurrences of the first event in the audio-visual content. In one or more examples, a spatial portion of the audio-visual content at the comment time in which the first event occurs may be identified. For example, the comment 504 may be semantically analysed and the term "goal" or "header" may be determined to indicate that the comment relates to an event in which the player has their head adjacent the ball or the ball is in the mouth of the goal. The audio-visual content can then be searched for when such an image is present around the comment time. An image of the player 501 heading the ball or the audio in the football stadium at that time may be extracted and used as input to identify replays of the first event or one or more second events later in the audio-visual content using further object/image/audio recognition.

The use of an appropriately trained neural network may be effective at identifying the reoccurrence of the first event, even when different camera angles/zoom levels are used. Thus, the apparatus 105 may be configured to extract a portion of the audio-visual content around the comment time, such as 1, 2, 3 or more video frames or some audio or both. These images and/or audio may form the input to a neural network, which may then analyse the audio-visual content temporally ahead of the relevant comment time to identify when a reoccurrence of the first event occurs and thereby determine the delayed time at which to present the comment. The neural network may be hosted at the apparatus 105 or at the server 104 or any other entity in communication with the apparatus 105 to enable the input (e.g. image(s)/audio at the comment time) to be transmitted to the neural network, the neural network-based analysis to be performed and the result (the delayed time) to be received by the apparatus 105.

While the above provides a plurality of options for determining when there is a reoccurrence of the first event, similar techniques may be used to determine the delayed time based on the occurrence of the second event that is deemed similar to the first event.

Thus, the second event may be determined to be similar to the first event in the audio-visual content based on pre-processed audio-visual content, which may comprise metadata such as said time stamped labels that identify one or more similar second events in the audio-visual content. In one or more other examples, object/image/audio recognition, such as by a neural network may be used to identify similar events and the same considerations as described above apply. In one or more examples, like the reoccurrence message described above, the apparatus 105 may be configured to receive a "similar event message" which tells the apparatus 105 the delayed time and therefore when to present the comment. The similar event message may be received with or after receipt of the comment information, such as after a request similar to described above in relation to the reoccurrence message. The similar event message is associated with the comment information, possibly by including an identifier for the comment information, so that the apparatus 105 knows to which comment the delayed time in the similar event message relates. Thus, based on any of the above example methods, the apparatus 105 may be able to identify future occurrences of either "first event reoccurrences" or "similar second events" relative the current time point of the audio-visual content being presented at the second device 102.

It will be appreciated that the similar event message or the reoccurrence message is received by the apparatus 105 during the same presentation "session" of the audio-visual content by the respective device 101, 102 rather than the comment being saved for when the audio-visual content is replayed at a later time, such as from the beginning. Thus, the apparatus 105 may be configured to receive the similar event message or the reoccurrence message at a later time to the receipt of the comment information but before an end of the audio-visual content as it is presented at the second device 102. In one or more examples, the similar event message or reoccurrence message may be indicative of the delayed time during the audio visual content to display the comment after the relevant comment time or may comprise an instruction to display the comment now, thereby, in effect, indicating the delayed time.

Regardless of the method used to determine the delayed time, in one or more examples, information indicative of a delayed time based on a reoccurrence of the first event may be used by the apparatus 105 in preference to information indicative of a delayed time based on a similar second event if both delayed times are determined to be present in the audio-visual content.

As mentioned above, the apparatus may be part of the first device 101, the second device 102 or the server 104.

If the apparatus 105 is provided in the first device 101, the apparatus 105A may be considered to receive the comment input from the first user or a user input device (e.g. keyboard, microphone, video camera) of the first device 101 and control when the comment is displayed at the second device 101. Accordingly, the apparatus 105A may request the timing information from the second device 102 or content server 103. The request or a different request may indicate that there is a comment for display with the audio-visual content and may request confirmation from the second device 102 that that the audio-visual content is being co-consumed by the first user and the second user or co-presented at their respective devices 101, 102. The apparatus 105 may send the comment information to the second device 102 and provide signalling to control when the second device 105 displays the comment. In other examples, the apparatus 105A may hold the comment information back from being sent to the second device 102 until the delayed time if it cannot be displayed before the relevant-comment time. The second device 102, in such an configuration, may be configured to display the comment as soon as it is received from the apparatus 105A because the apparatus 105A has provided the control of when best to display the comment, such as with the first event, at the time of a reoccurrence of the first event or at the time of the similar second event, as described in more detail above. Further, comment information may be deemed to be associated with the content by virtue of the apparatus 105A presenting the audio-visual content when the comment information is received. The similar event message or reoccurrence message may be received from the server 104 or any other device that performs the determination of when the delayed time may be.

If the apparatus 105 is provided in the server 104, the apparatus 105C may be considered to receive the comment input from the first device 101 and control when the comment is displayed at the second device 101. Accordingly, the apparatus 105C may request the timing information from the second device 102 or content server 103. The request or a different request may indicate that there is a comment for display with the audio-visual content and may request confirmation from the second device 102 that the audio-visual content is being co-consumed by the first user and the second user or co-presented at their respective devices 101, 102. The apparatus 105C may send the comment information to the second device 102 and provide signalling to control when the second device 105 displays the comment. In other examples, the apparatus 105C may hold the comment information back from being sent to the second device 102 until the delayed time if it cannot be displayed before the relevant-comment time. The second device 102, in such an configuration, may be configured to display the comment as soon as it is received form the apparatus 105C because the apparatus 105C has provided the control of when best to display the comment, such as with the first event, at the time of a reoccurrence of the first event or at the time of the similar second event, as described in more detail above. Further, comment information may be deemed to be associated with the content by virtue of the first device 101 presenting the audio-visual content when the comment information was generated or when it is received and, accordingly, the comment information may include this information. The similar event message or reoccurrence message may be generated by the apparatus 105C or a different apparatus operating on the server 104 or any other device that performs the determination of when the delayed time may be.

Figure 9:
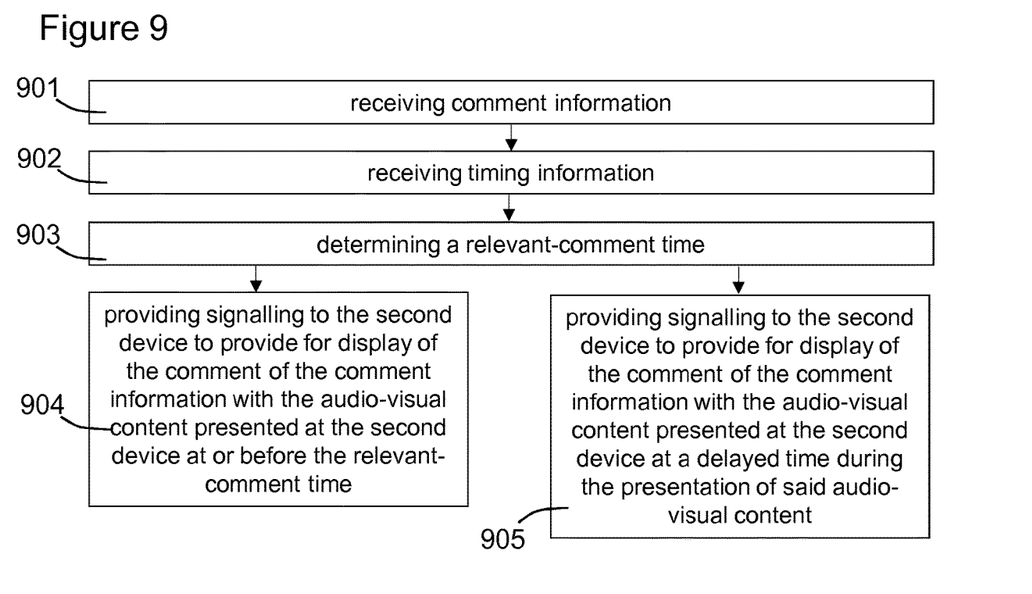
FIG. 9 shows a flowchart illustrating an example method.

FIG. 9 shows a flow diagram illustrating the steps of,
receiving 901 comment information from a first device, the comment information associated with audio-visual content and comprises a comment for presentation at a second device remote from the first device and a comment time indicative of a time during the audio-visual content to which the comments relates;
receiving 902 timing information from the second device, the timing information indicative of a time during the audio-visual content that is currently being presented at the second device;
determining 903 a relevant-comment time comprising the comment time plus a relevance threshold time; and wherein
if the time during the audio-visual content that is currently being presented at the second device is less than or equal to the relevant-comment time, providing signalling 904 to the second device to provide for display of the comment of the comment information with the audio-visual content presented at the second device at or before the relevant-comment time; and
if the time during the audio-visual content that is currently being presented at the second device is greater than the relevant-comment time, providing signalling 905 to the second device to provide for display of the comment of the comment information with the audio-visual content presented at the second device at a delayed time during the presentation of said audio-visual content, the delayed time later than the relevant-comment time and comprising at least one of:
a) a time during the audio-visual content at which there is a reoccurrence of a first event in the audio-visual content, the first event having occurred in the audio-visual content at the comment time; and
b) a time during the audio-visual content at which there is a second event, different to the first event, that is determined to be similar to the first event in the audio-visual content that occurred at the comment time.

Figure 10:
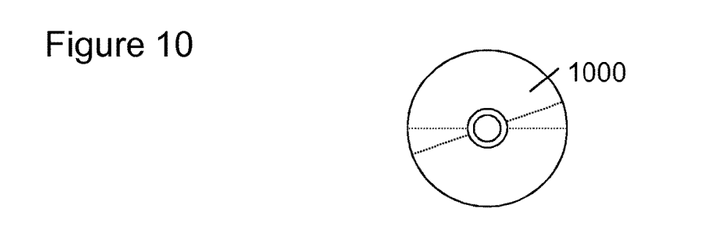
FIG. 10 shows a computer readable medium.

FIG. 10 illustrates schematically a computer/processor readable medium 1000 providing a program according to an example. In this example, the computer/processor readable medium is a disc such as a digital versatile disc (DVD) or a compact disc (CD). In some examples, the computer readable medium may be any medium that has been programmed in such a way as to carry out an inventive function. The computer program code may be distributed between the multiple memories of the same type, or multiple memories of a different type, such as ROM, RAM, flash, hard disk, solid state, etc.

User inputs may be gestures which comprise one or more of a tap, a swipe, a slide, a press, a hold, a rotate gesture, a static hover gesture proximal to the user interface of the device, a moving hover gesture proximal to the device, bending at least part of the device, squeezing at least part of the device, a multi-finger gesture, tilting the device, or flipping a control device. Further the gestures may be any free space user gesture using the user's body, such as their arms, or a stylus or other element suitable for performing free space user gestures.

The apparatus shown in the above examples may be a portable electronic device, a laptop computer, a mobile phone, a Smartphone, a tablet computer, a personal digital assistant, a digital camera, a smartwatch, smart eyewear, a pen based computer, a non-portable electronic device, a desktop computer, a monitor, a smart TV, a server, a wearable apparatus, a virtual reality apparatus, or a module/circuitry for one or more of the same.

Any mentioned apparatus and/or other features of particular mentioned apparatus may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some examples, a particular mentioned apparatus may be pre-programmed with the appropriate software to carry out desired operations, and wherein the appropriate software can be enabled for use by a user downloading a "key", for example, to unlock/enable the software and its associated functionality. Advantages associated with such examples can include a reduced requirement to download data when further functionality is required for a device, and this can be useful in examples where a device is perceived to have sufficient capacity to store such pre-programmed software for functionality that may not be enabled by a user.

Any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

Any "computer" described herein can comprise a collection of one or more individual processors/processing elements that may or may not be located on the same circuit board, or the same region/position of a circuit board or even the same device. In some examples one or more of any mentioned processors may be distributed over a plurality of devices. The same or different processor/processing elements may perform one or more functions described herein.

The term "signalling" may refer to one or more signals transmitted as a series of transmitted and/or received electrical/optical signals. The series of signals may comprise one, two, three, four or even more individual signal components or distinct signals to make up said signalling. Some or all of these individual signals may be transmitted/received by wireless or wired communication simultaneously, in sequence, and/or such that they temporally overlap one another.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/examples may consist of any such individual feature or combination of features. In view of the foregoing description it will be evident to a person skilled in the art that various modifications may be made within the scope of the disclosure.

While there have been shown and described and pointed out fundamental novel features as applied to examples thereof, it will be understood that various omissions and substitutions and changes in the form and details of the devices and methods described may be made by those skilled in the art without departing from the scope of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or examples may be incorporated in any other disclosed or described or suggested form or example as a general matter of design choice. Furthermore, in the claims means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus comprising:
   at least one processor; and
   at least one non-transitory memory including computer program code;
   the at least one memory and the computer program code configured to, with the at least one processor, cause the apparatus at least to:
      receive comment information from a first device, the comment information associated with audio-visual content and comprises
         a comment for presentation at a second device remote from the first device and
         a comment time indicative of a time point during the audio-visual content to which the comment relates;
      receive timing information from the second device, the timing information indicative of a time point during the audio-visual content that is currently being presented at the second device;
      determine a relevant-comment time during the audio-visual content, wherein the relevant-comment time comprises the comment time plus a relevance threshold time; and
      in response to the time point during the audio-visual content that is currently being presented at the second device being greater than the relevant-comment time during the audio-visual content, provide signalling to the second device to provide for display of the comment of the comment information with the audio-visual content presented at the second device at a delayed time point during the audio-visual content, the delayed time point being later than the relevant-comment time and comprising at least one of:
         a time point during the audio-visual content at which there is a reoccurrence of a first event during the audio-visual content, the first event having occurred during the audio-visual content at the comment time; or
         a time point during the audio-visual content at which there is a second event, different to the first event, that is determined to be similar to the first event during the audio-visual content that occurred at the comment time.

2. The apparatus of claim 1, wherein the comment information is received while the audio-visual content is being presented at the second device, wherein the comment information is associated with the audio-visual content based, at least partially, on the comment information at least one of:
   originating from the first device which receives the audio-visual content at a same time as the second device receives the audio-visual content;
   originating from a user who is presented with the audio-visual content via the first device; or
   including information that specifies it relates to the audio-visual content.

3. The apparatus of claim 1, wherein the comment comprises a comment in response to the first event in the audio-visual content, wherein said reoccurrence of the first event comprises one or both of:
   a replay of the first event that was presented in the audio-visual content at the comment time from a same point of view as it was presented at the comment time; or
   a replay of the first event that was presented in the audio-visual content at the comment time from a different point of view than it was presented at the comment time.

4. The apparatus of claim 1, wherein said time point at which there is the reoccurrence of the first event is determined based on at least one of:
   metadata present in the audio-visual content that identifies the reoccurrence of the first event in the audio-visual content;
   a reoccurrence message received with or after receipt of the comment information by the apparatus, the reoccurrence message associated with the comment information and indicative of a time point during the audio-visual content of at least one reoccurrence of the first event in the audio-visual content; or
   an output of a neural network, the neural network configured to identify one or more reoccurrences of the first event of the audio-visual content based on the first event of the audio-visual content.

5. The apparatus of claim 1, wherein the second event is determined to be similar to the first event in the audio-visual content based on one or more of:
   metadata present in the audio-visual content that identifies one or more similar second events in the audio-visual content;
   an output of a neural network, the neural network configured to identify the one or more similar second events in the audio-visual content based on the first event of the audio-visual content; or
   a similar event message received with or after receipt of the comment information by the apparatus, the similar event message associated with the comment information, and wherein the similar event message is indicative of a time during the audio-visual content of at least one occurrence of the second event in the audio-visual content.

6. The apparatus of claim 1, wherein the at least one memory and the computer program code are further configured to, with the at least one processor, cause the apparatus to:

in response to the time point during the audio-visual content that is currently being presented at the second device being less than or equal to the relevant-comment time, provide signalling to the second device to provide for display of the comment of the comment information with the audio-visual content presented at the second device at or before the relevant-comment time.

7. The apparatus of claim 1, wherein the audio-visual content comprises one of virtual reality content or visual and audio content.

8. The apparatus of claim 1, wherein the at least one memory and the computer program code are further configured to, with the at least one processor, cause the apparatus to:
identify a spatial portion of the audio-visual content at the comment time in which the first event occurs based at least on part of the comment; and
determine one or more reoccurrences of the first event or the second event based, at least partially, on said identified spatial portion.

9. The apparatus of claim 1, wherein the audio-visual content comprises live audio-visual content and wherein the at least one memory and the computer program code are further configured to, with the at least one processor, cause the apparatus to
analyze the audio-visual content as it is received to identify one or both of the reoccurrence of the first event and/or the second event.

10. The apparatus of claim 1, wherein the apparatus comprises, at least in part, the first device.

11. The apparatus of claim 1, wherein the apparatus comprises, at least in part, the second device.

12. The apparatus of claim 10, wherein the first device is configured to:
receive the audio-visual content; and
present the received audio-visual content.

13. The apparatus of claim 11, wherein the second device is configured to:
receive the audio-visual content; and
present the received audio-visual content.

14. The apparatus of claim 1, wherein the apparatus comprises, at least in part, a server configured for communication with the first device and the second device.

15. A method comprising:
receiving comment information from a first device, the comment information associated with audio-visual content and comprises
a comment for presentation at a second device remote from the first device and
a comment time indicative of a time point during the audio-visual content to which the comment relates;
receiving timing information from the second device, the timing information indicative of a time point during the audio-visual content that is currently being presented at the second device;
determining a relevant-comment time during the audio-visual content, wherein the relevant-comment time comprises the comment time plus a relevance threshold time; and
in response to the time point during the audio-visual content that is currently being presented at the second device being greater than the relevant-comment time during the audio-visual content, providing signalling to the second device to provide for display of the comment of the comment information with the audio-visual content presented at the second device at a delayed time point during the audio-visual content, the delayed time point being later than the relevant-comment time and comprising at least one of:
a time point during the audio-visual content at which there is a reoccurrence of a first event during the audio-visual content, the first event having occurred during the audio-visual content at the comment time; or
a time point during the audio-visual content at which there is a second event, different to the first event, that is determined to be similar to the first event during the audio-visual content that occurred at the comment time.

16. The method of claim 15, wherein the comment information is associated with the audio-visual content based, at least partially, on the comment information at least one of:
originating from the first device which receives the audio-visual content at a same time as the second device receives the audio-visual content;
originating from a user who is presented with the audio-visual content via the first device; or
including information that specifies it relates to the audio-visual content.

17. The method of claim 15, wherein said reoccurrence of the first event comprises one or both of:
a replay of the first event that was presented in the audio-visual content at the comment time from a same point of view as it was presented at the comment time; or
a replay of the first event that was presented in the audio-visual content at the comment time from a different point of view than it was presented at the comment time.

18. The method of claim 15, wherein said time point at which there is the reoccurrence of the first event is determined based on at least one of:
metadata present in the audio-visual content that identifies the reoccurrence of the first event in the audio-visual content;
a reoccurrence message received with or after receipt of the comment information by the apparatus, the reoccurrence message associated with the comment information and indicative of a time point during the audio-visual content of at least one reoccurrence of the first event in the audio-visual content; or
an output of a neural network, the neural network configured to identify one or more reoccurrences of the first event of the audio-visual content based on the first event of the audio-visual content.

19. The method of claim 15, wherein the second event is determined to be similar to the first event in the audio-visual content based on one or more of:
metadata present in the audio-visual content that identifies one or more similar second events in the audio-visual content;
an output of a neural network, the neural network configured to identify the one or more similar second events in the audio-visual content based on the first event of the audio-visual content; or
a similar event message received with or after receipt of the comment information by the apparatus, the similar event message associated with the comment information, and wherein the similar event message is indicative of a time during the audio-visual content of at least one occurrence of the second event in the audio-visual content.

20. A non-transitory computer readable medium comprising program instructions for causing an apparatus to perform at least the following:
receiving comment information from a first device, the comment information associated with audio-visual content and comprises
a comment for presentation at a second device remote from the first device and
a comment time indicative of a time point during the audio-visual content to which the comment relates;
receiving timing information from the second device, the timing information indicative of a time point during the audio-visual content that is currently being presented at the second device;
determining a relevant-comment time during the audio-visual content, wherein the relevant-comment time comprises the comment time plus a relevance threshold time; and
in response to the time point during the audio-visual content that is currently being presented at the second device being greater than the relevant-comment time during the audio-visual content, providing signalling to the second device to provide for display of the comment of the comment information with the audio-visual content presented at the second device at a delayed time point during the audio-visual content, the delayed time point being later than the relevant-comment time and comprising at least one of:
a time point during the audio-visual content at which there is a reoccurrence of a first event during the audio-visual content, the first event having occurred during the audio-visual content at the comment time; or
a time point during the audio-visual content at which there is a second event, different to the first event, that is determined to be similar to the first event during the audio-visual content that occurred at the comment time.

* * * * *